Oct. 3, 1961  G. H. SCHWALM ET AL  3,002,408
WIRE STRIPPING APPARATUS
Filed Nov. 3, 1959  6 Sheets-Sheet 1
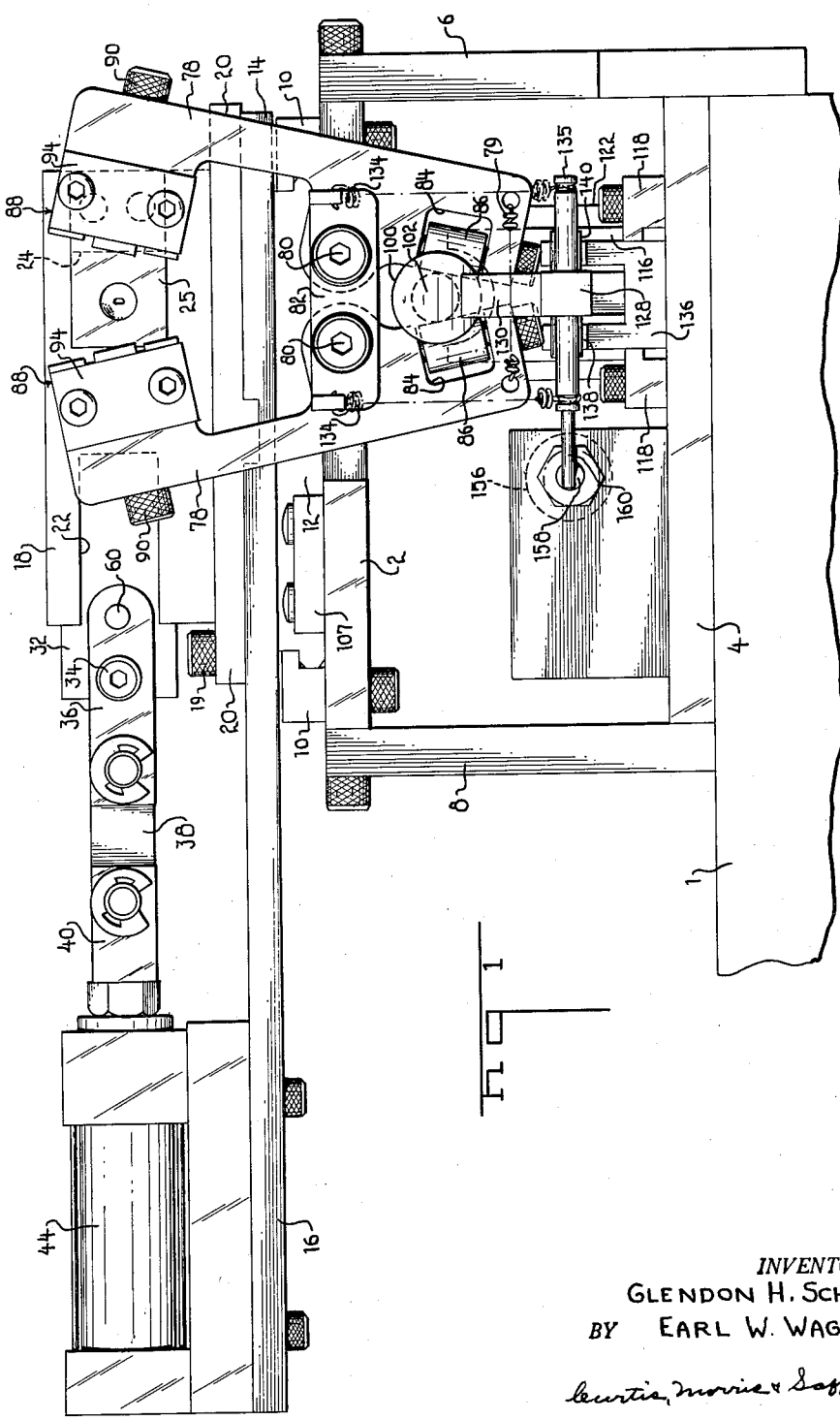
INVENTORS
GLENDON H. SCHWALM
BY  EARL W. WAGNER
Curtis, Morris & Safford

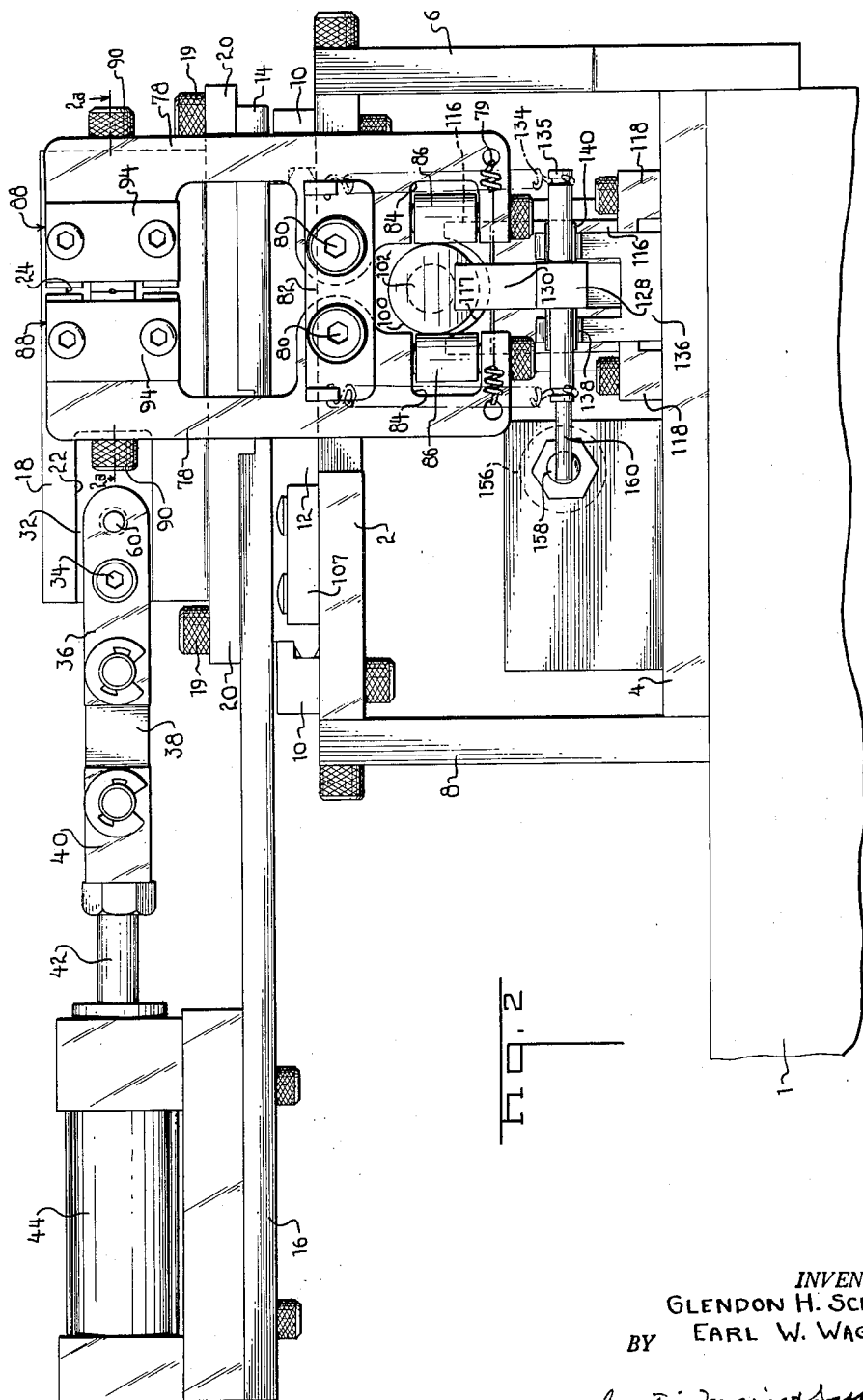

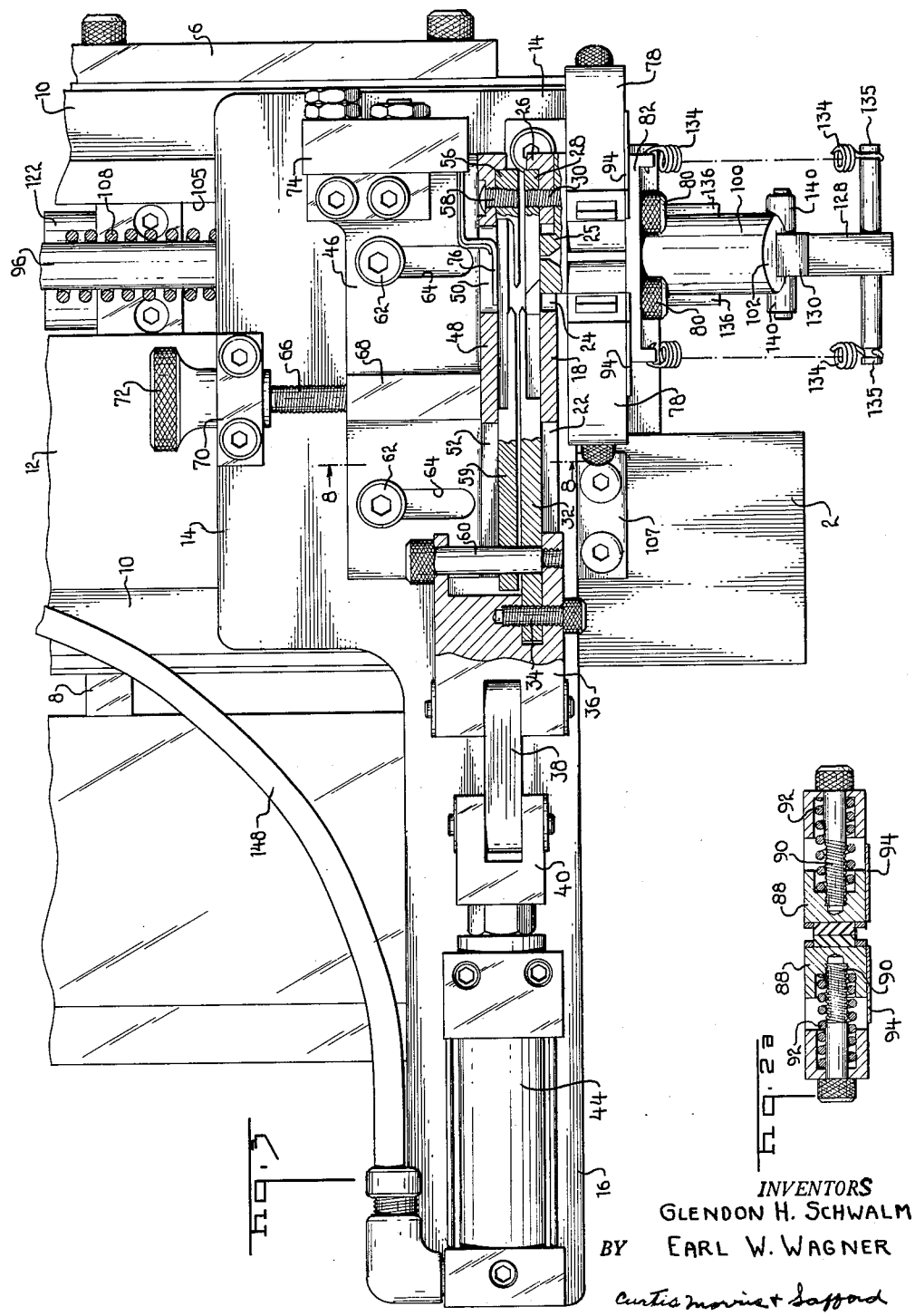

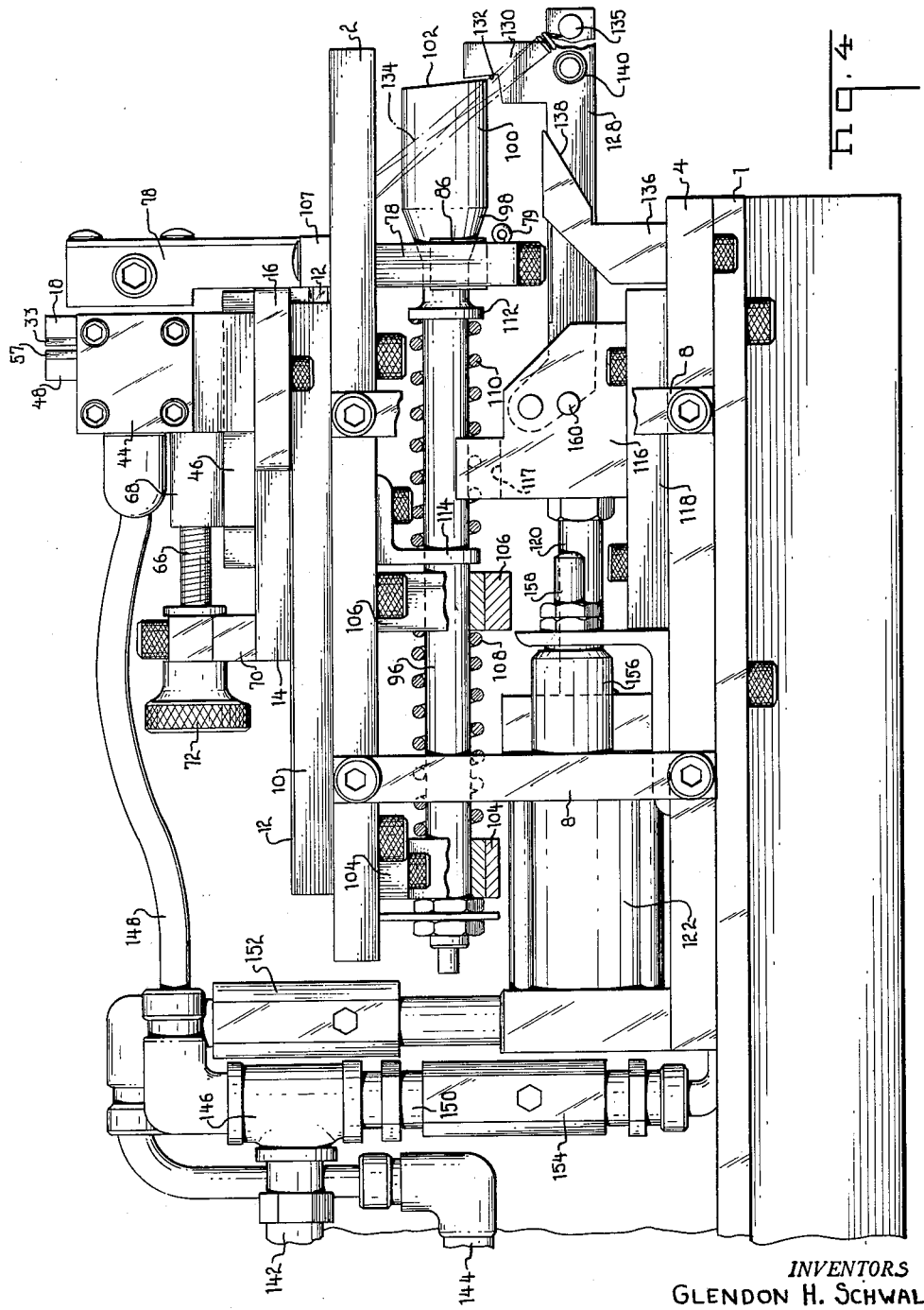

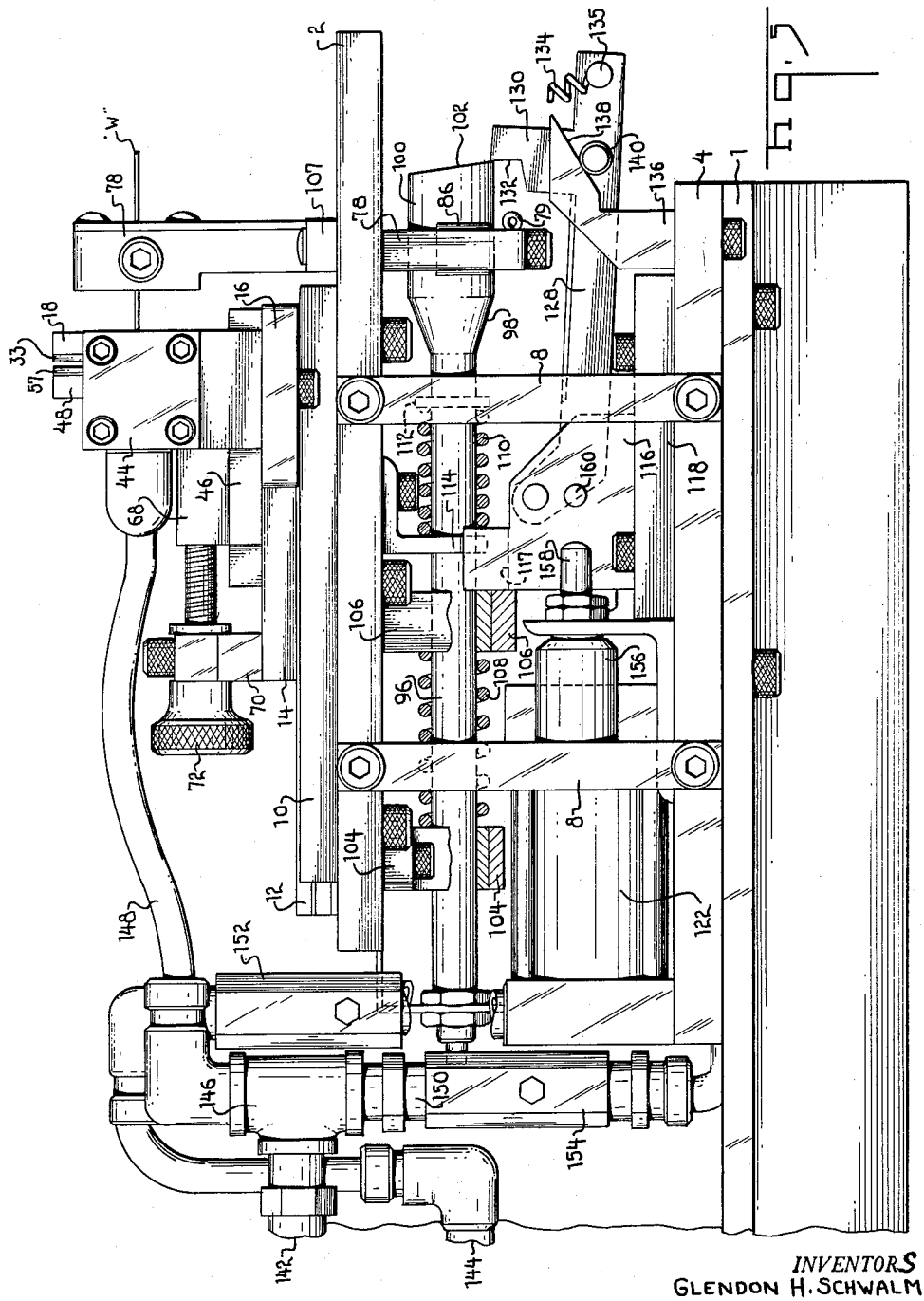

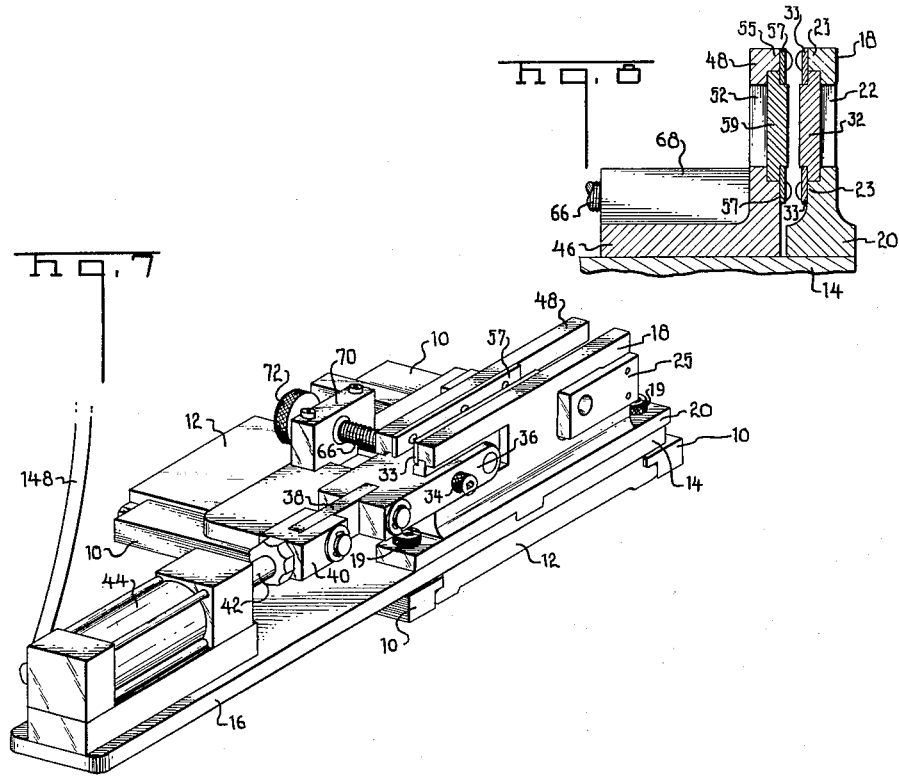
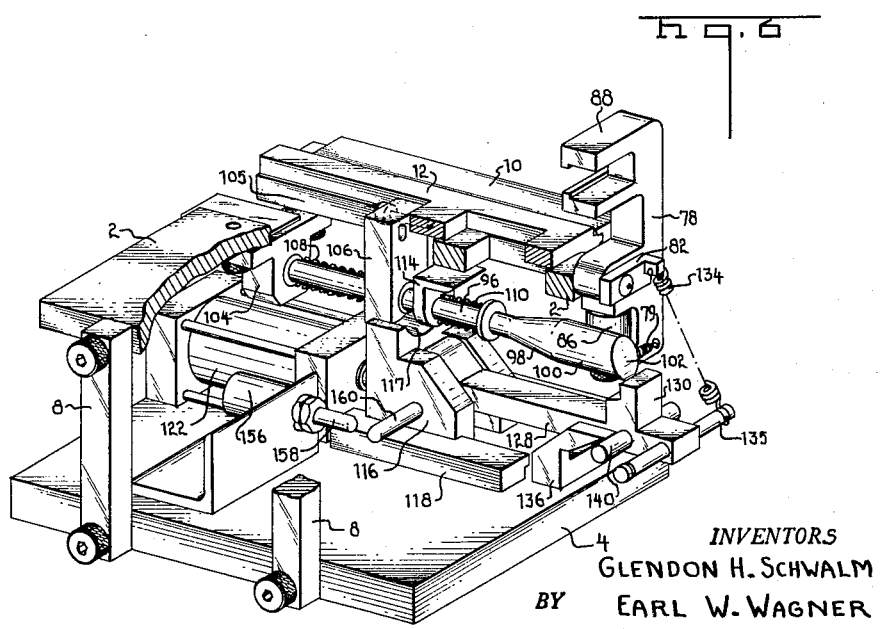

3,002,408
WIRE STRIPPING APPARATUS
Glendon H. Schwalm, Harrisburg, and Earl W. Wagner, Lebanon, Pa., assignors to AMP Incorporated, Harrisburg, Pa.
Filed Nov. 3, 1959, Ser. No. 850,579
6 Claims. (Cl. 81—9.51)

This invention relates to devices for stripping the insulation from the ends of wires.

An object of the invention is to provide a wire-stripping device having improved adjusting means for varying the amount of insulation removed from the wire end. A further object is to provide a stripping device having improved wire gripping means. A still further object is to provide a wire stripping device having improved actuating means for actuating the stripping blades and the wire gripping means. A further object is to provide a wire stripping apparatus which can be used for stripping relatively short lengths of wire.

These and other objects are achieved in the preferred embodiment of the invention comprising a pair of pivotally mounted wire grippers which are resiliently biased to their open position. Aligned with the grippers are a set of insulation cutting knives and a set of wire trimming blades, the wire trimming blades being adjustably mounted so that they can be moved towards and away from the insulation-cutting knives thereby to permit variation in the amount of insulation removed from the wire end. The wire grippers are fixed with respect to the insulation-cutting knives and the wire trimming blades, and the blades and knives are movable as a unit away from the grippers so that upon closure of the insulation-cutting knives and subsequent movement thereof away from the grippers, a cut section of insulation is axially moved off of the end of the inserted wire. Closing and opening of the wire grippers is achieved by means of an axially movable camming rod having on one end thereof camming portions which are engageable with the grippers to close the grippers into engagement with an inserted wire. This rod is moved axially by means of a latch which is normally engaged with the rod and which is secured to the piston rod of a pneumatic cylinder. This piston rod also moves the blades and knives away from the grippers thereby to strip the cut section of insulation. The latch is disengaged from the camming rod towards the end of the working stroke and the camming rod returns to its original position to permit the jaws or grippers to open at the end of the stroke.

In the drawings:

FIGURE 1 is a frontal view of a preferred embodiment of the invention;

FIGURE 2 is a view similar to FIGURE 1 but showing the wire grippers in their closed position;

FIGURE 2A is a view taken along the lines 2a—2a of FIGURE 2.

FIGURE 3 is a plan view with parts broken away to show the structure of the insulation-cutting knives and the wire severing blades;

FIGURES 4 and 5 are side views of the preferred embodiment, FIGURE 4 showing the positions occupied by the parts at the beginning of the operating cycle and FIGURE 5 showing the positions occupied by the parts near the end of the working stroke;

FIGURE 6 is a perspective view showing the camming rod, the actuating piston and cylinder, and the latch and slide by means of which the rod is moved;

FIGURE 7 is a perspective view showing the wire severing blades and the insulation-cutting knives; and FIGURE 8 is a view taken along the lines 8—8 of FIGURE 3.

In the disclosed embodiment there is provided a supporting framework comprising a base plate 4, which rests upon a surface 1, and a platform 2 which is supported by means of a side plate 6 and braces 8. A carriage 12 is supported on the upper surface of platform 2 between gibs 10 for movement towards and away from the front of the device. A support plate 14 having a laterally extending arm 16 is, in turn, secured to carriage 12 for movement therewith and supports the insulation cutting knives and the wire severing blades.

The cutting knives 28, 32 are contained within a holder 18 having a base 20 which is secured to plate 14 by screws 19. As shown in FIGURES 1 and 7, this holder has a cut out portion 22 on its lefthand side as viewed in FIGURE 1 and a central opening 24. The rearwardly facing surface of the holder is recessed to define flanges 23 which extend along its sides (FIGURE 8) and an end flange 26 on its right hand side. A fixed insulation cutting knife 28 is seated against flange 26 and secured in place by means of a machine screw 30. A movable insulation cutting knife 32 is secured by means of a fastener 34 in a recess in a yoke member 36 which in turn is connected by means of a link 38 and a clevis 40 to the piston rod 42 of a single acting pneumatic cylinder 44. This cylinder is supported on laterally extending arm 16 of plate 14 so that it can move with the insulation cutting knives. Gibs 33 are secured to flanges 23 and extend inwardly of the holder to define guideways for the movable cutting knife. Advantageously a wire guide 25, having a central opening through which the wire is inserted, is provided in opening 24 and held in place by screw 30.

A shearing blade holder 48 has a base portion 46 which is clamped to plate 14 by clamping screws 62 which extend through slots 64 in the base. Holder 48 has a central opening 50 aligned with opening 24 and a cut out portion 52 aligned with the cut out 22 of holder 18. A fixed shearing blade 56 is secured in the recessed face of the holder by means of a fastener 58 and a movable shearing blade 59 is provided for cooperation with this fixed shearing blade. This movable blade is held in place by gibs 57 which are secured to the side flanges 55 of the holder. The movable shearing blade is secured at its end by means of a fastener 60, having a smooth cylindrical surface intermediate its ends, to yoke 36 so that the movable shearing blade is reciprocated upon actuation of piston 44. Base portion 46 of the blade holder is adjustably clamped to the surface of plate 14 by means of the clamping screws 62 thereby to permit adjustment of the blade holder and the blades towards and away from the front of the device. Such adjustment is achieved by means of a screw 66 threaded into an opening in a rib 68 on base 46 and having a knob 72 on its end which is supported for rotation in a bearing pedestal 70 on plate 14. A micro-switch 74 mounted on base portion 46 has a contact arm 76 which extends into opening 50 in holder 48. This microswitch initiates the operating cycle of the device when a wire is passed against arm 76 as explained below.

The wire clamping means (FIGURES 1 and 2) comprises a pair of levers 78 which are pivotally mounted intermediate their ends at 80 by means of pins which extend through a plate 82 and into platform 2. The lower ends of these levers are notched as shown at 84 for the accommodation of cam followers 86 and the upper ends provide opposed jaws 88 (FIGURE 2A) which are secured to the ends of the levers by means of screws 90 and retaining plates 94. Advantageously, springs 92 acting between recesses in the levers and in the jaws are provided in order to bias the jaws against each other and the faces of the jaws are provided with resilient material so that the inserted wires will not be damaged when they are gripped. A spring 79 connects the lower ends of the levers so that the jaws are normally open.

Usually a guard is provided on the apparatus in front of the wire clamping jaws in order to protect the operator from digital injury. This guard (not shown) may be positioned in a plane close to and directly in front of, the wire clamping jaws.

Referring now to FIGURES 4, 5 and 6, there is provided beneath platform 2 and substantially in alignment with the jaws and blades, a camming rod 96 having a conical portion 98 near its right hand end which merges with a cylindrical end portion 100 having a bevelled face 102. This rod is slidably supported in a fixed bearing support 104 secured to the under side of platform 2 and in a movable bearing support 106 which extends upwardly through a slot 105 in platform 2, into a slot in slide 12, and is secured to the plate by means of fasteners (FIGURE 7). A spring 108 interposed between bearings 106 and 104 normally biases bearing 106 and slide member 12 to the right as viewed in FIGURE 4 against a stop 107 on platform 2. A spring 110 is interposed between a collar 112 on rod 96 and a fixed bracket 114 secured to the underside of platform 2. This spring 110 normally biases the camming rod 96 rightwardly as viewed in FIGURE 4.

Reciprocably mounted between gibs 118 on the upper surface of plate 4 is a slide member or shuttle 116 which is secured to the end of a piston rod 120 extending from a double acting pneumatic cylinder 122. The upper portion of shuttle 116 is centrally cut away as shown at 117 so that it does not engage camming rod 96 or bracket 114, however, the shuttle extends above depending bearing 106 so that the bearing is engaged by the shuttle upon movement thereof. A latch member 128 is pivotally mounted on shuttle 116 in a central hollow portion thereof and extends substanitally parallel to and beyond the end of rod 96. An arm 130 which projects laterally from the end of latch 128 is notched at 132 for engagement with bevelled surface 102. Springs 134 secured at one end to a projection on plate 82 and at their opposite ends to pins 135 in the end of the latch, normally hold the latch in engagement with the face of the camming rod, however, toward the end of the operating cycle or working stroke, as described below, it is necessary to disengage the latch from the rod. Such disengagement is achieved by means of cams 136 secured to base plate 4 and having inclined camming surfaces 138 which are engageable with cam followers 140 on the latch.

Air is supplied to the apparatus from a solenoid valve (not shown) and inlet air lines 142, 144. Line 142 enters a T fitting 146 from which extends a first line 148 to cylinder 44 and a second line 150 which extends through a flow control fitting 154 to the right hand side (as viewed in FIGURE 4) of cylinder 122. Line 144 extends through flow control fitting 152 to the left hand side of cylinder 122. Fittings 152, 154 function to retard slightly the flow of air to the cylinder 122 for reasons which will be apparent from the description which follows.

The solenoid valve is controlled by switch 74 and by an additional switch 156 having an actuating plunger 158, which is contacted by a pin 160 on shuttle 116. The arrangement of the solenoid controlled valve should be such that upon closure of switch 74, air is admitted through line 142 to cylinder 44 and the right hand end of cylinder 122, and upon subsequent closure of switch 156, air is admitted through line 150 to the left hand end of cylinder 122.

In operation, the parts will be in the positions shown in FIGURES 1 and 3 at the beginning of the cycle. The operator inserts the unstripped end of the wire W past the jaws and through the openings 24, 50 until the wire end contacts switch arm 74. This switch energizes the solenoid valve to admit air through line 142 to cylinder 44 and to the righthand end of cylinder 122. Piston rod 42 moves rightwardly in FIGURE 2 and piston rod 120 in FIGURE 3 moves leftwardly, the movement of piston rod 120 being delayed slightly by flow control 152. Upon rightward movement of piston rod 42, the insulation-cutting knife 32 and the wire severing blade 59 move relatively towards their fixed counterparts and the end of the wire is trimmed and the insulation adjacent the end is circumferentially cut. During the remainder of the working stroke, these blades remain closed. As piston rod 120 moves leftwardly as viewed in FIGURE 3, shuttle 116 and latch 128 are also moved leftwardly and the latch in turn moves camming rod 96 in the same direction. As the conical end portion 98 of this camming rod moves between cam rollers 86 on the lower ends of the gripping members 78 the jaws of the gripping members move relatively towards each other at their upper ends and the jaws engage the wire. The jaws are completely closed when the cylindrical portion 100 of the camming rod is between the lower ends of the gripping levers as shown in FIGURE 4. Thereafter, as shuttle 116 continues to move leftwardly, it engages depending bearing support 106 toward the end of the working stroke and during the end portion of this stroke, the bearing support itself and carriage 12 are also pushed leftwardly. Since this carriage carries the entire stripping mechanism excepting the wire grippers 78, the stripping knives and shearing blades are moved relatively away from these grippers and the severed element of insulation is removed from the wire end.

Towards the end of the working stroke, cam follower 140 on the end of latch 128 engages inclined camming surfaces 138 of the fixed cams 136. These camming surfaces cause the latch member to move relatively downwardly as viewed in FIGURE 5 against the force of springs 134 until the arm 130 is disengaged from the bevelled face 102 of the rod. At this time, spring 110 will have been compressed so that upon disengagement of the latch from the face of the camming rod, the rod is moved rightwardly to its position of FIGURE 4 and the wire grippers are disengaged from the wire end. Shortly thereafter, the shuttle reaches the end of its working stroke and contacts microswitch 156 which in turn energizes the solenoid valve so that air is exhausted from cylinder 44 thereby allowing the knife blades to open and at the same time air is admitted to the lefthand end of cylinder 122 to drive piston rod 120 and shuttle 116 rightwardly. During this portion of the cycle, flow control fitting 142 causes the return stroke of piston rod 120 to be delayed briefly so that camming rod 96 is permitted to return to the position of FIGURE 1 before the return stroke of the piston rod and shuttle takes place. Also, during this brief interval, the operator can remove the wire from between the jaws of the grippers and avoid damage to the stripped end by the blades as they return to their starting position.

A salient advantage of the invention is that the wire grippers 78 are fixed with respect to the insulation cutting knives and the wire severing blades and the blades move relatively away from the wire. By virtue of this arrangement, the wire can be manually held in a plane very close to the front of the grippers and inserted by the operator during use. Since the grippers themselves do not move, the previously mentioned guard or shield (not shown) which limits the position beyond which the operator may not reach can be disposed almost against the face of these grippers. This feature of the invention permits the stripping of the ends of very short wires, for example wires two inches in length or less. By way of contrast, in the many prior art stripping devices where the blades and knives remain fixed and the grippers move away from the blades and knives, it has been found that the operator tends to flinch when the machine is actuated in anticipation of the movement of the grippers.

This has been found to result in imperfect stripping of the wire ends where the operator moves the wire backwardly before the gripping jaws have firmly clamped it relative to the blades and knives.

An added feature of the invention is that the gripping jaws open prior to the end of the working stroke during which the blades and knives are moved away from the jaws. With this arrangement, when the blades and knives return to their initial position they do not encounter the stripped end of the wire so that there is no possibility that the strands in the stripped end will bend or otherwise be disarranged by the faces of the insulation cutting knives. It should be noted that it is not essential that the operator withdraw the wire immediately since even if the face of one of the knives does encounter the wire, the wire will yield at a point remote from the stripped end and the stripped end will therefore not be damaged.

If it is desired to vary the amount of insulation removed from the wire ends, it is merely necessary to loosen screws 62, and rotate knob 72 thereby to move blade holder 46 towards or away from the fixed insulation cutting knives 28, 32. There is thus no necessity for spacers or for disassembling the stripping knives and severing blades if such changes are desired.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

We claim:

1. In an insulation stripping device of the type comprising, a pair of normally open wire grippers and a pair of closable insulation cutting knives, said knives being movable away from said grippers thereby to strip insulation from a wire end, the improvement comprising, a carriage, said knives being mounted on, and movable with, said carriage, a movable camming rod having camming portions engageable with said grippers upon movement of said rod to close said grippers into engagement with a wire, spring means normally biasing said rod to maintain said camming portions out of engagement with said grippers, a shuttle reciprocable in the direction of movement of said carriage and said rod, said shuttle having rod engaging means pivotally mounted thereon and normally in engagement with said rod whereby upon initial movement of said shuttle, said rod is moved until said camming portions close said grippers, said shuttle having means thereon engageable with said carriage at the end of the stroke of said shuttle whereby said carriage is moved away from said knives, and fixed camming means engageable with said rod engaging means to disengage said rod engaging means from said camming rod whereby said jaws are opened at the end of the stroke of said shuttle.

2. In an insulation stripping device of the type comprising, a pair of normally open wire grippers and a pair of closable insulation cutting knives, said knives being normally disposed adjacent to said grippers and being movable relatively away therefrom to strip a cut element of insulation from a wire end, the improvement comprising, an axially movable camming rod having camming portions thereon engageable with said grippers to close said grippers into engagement with a wire, resilient means normally maintaining said camming rod in a position with said camming portions disengaged from said grippers, a reciprocable shuttle for effecting relative movement of said grippers and said knives away from each other, rod engaging means pivotally mounted on said shuttle and normally in engagement with said camming rod, and fixed camming means for disengaging said cam engaging means from said camming rod at the end of the stroke of said shuttle whereby, said camming portions are disengaged from said grippers at the end of the stroke of said shuttle and before relative movement of said knives and said grippers towards each other.

3. An insulation stripping device comprising, a pair of levers pivotally mounted on spaced apart axes, each of said levers having a wire gripping jaw on one end thereof, spring means normally biasing the opposite ends of said levers towards each other whereby said jaws are normally open, a camming rod movable between said opposite ends and having camming means thereon engageable with said opposite ends to close said jaws, resilient means normally maintaining said rod in a position with said camming means out of engagement with said opposite ends, a carriage, a pair of insulation cutting knives on said carriage, a reciprocable shuttle engageable with said carriage thereby to move said knives away from said jaws, rod engaging latch means pivotally mounted on said shuttle and normally engaged with said rod whereby, upon movement of said shuttle said rod is moved to close said jaws, and fixed camming means engageable with said latch means near the end of the stroke of said shuttle to disengage said latch from said rod whereby, said rod returns to its normal position and said jaws are opened before return of said knives.

4. An insulation stripping device comprising, a pair of normally open wire grippers, a pair of closable insulation cutting knives, and a pair of closable wire trimming blades, said blades and knives being mounted on a carriage and in alignment with said grippers, an axially movable camming rod having camming portions on one end thereof engageable with said grippers to close said grippers into engagement with a wire, resilient means normally maintaining said camming rod in a position with said camming portions disengaged from said grippers, a reciprocable actuating rod, camming rod moving means on said actuating rod for moving said camming rod axially to close said grippers, lost motion carriage moving means on said actuating rod for moving said carriage away from said grippers to strip a cut section of insulation from a wire end, and means for disengaging said camming rod moving means from said camming rod after movement of said carriage away from said grippers whereby, said rod returns to its normal position under the influence of said resilient means and said grippers are opened prior to return movement of said carriage.

5. An insulation stripping device comprising, a pair of normally open wire grippers, a pair of closable insulation cutting knives, and a pair of closable wire trimming blades, said blades and knives being mounted on a carriage and in alignment with said grippers, an axially movable camming rod having camming portions on one end thereof engageable with said grippers to close said grippers into engagement with a wire, resilient means normally maintaining said camming rod in a position with said camming portions disengaged from said grippers, a reciprocable actuating rod, camming rod moving means on said actuating rod for moving said camming rod axially to close said grippers, lost motion carriage moving means on said actuating rod for moving said carriage, after closure of said grippers, away from said grippers to strip a cut section of insulation from a wire end, and means for disengaging said camming rod moving means from said camming rod after movement of said carriage away from said grippers whereby, said rod returns to its normal position under the influence of said resilient means and said grippers are opened prior to return movement of said carriage, and means on said carriage for moving said trimming blades relatively towards and away from said insulation cutting knives thereby to change the amount of insulation stripped from the wire end.

6. An insulation stripping device comprising, a pair of normally open wire grippers and a pair of closable insulation cutting knives, said knives being normally disposed adjacent to said grippers, an axially movable camming rod having camming portions on one end thereof engageable with said grippers to close said grippers into engagement with a wire, said camming portions being normally disengaged from said grippers, a reciprocable actuating rod, camming rod moving means on said reciprocable actuating rod for moving said camming rod axially upon movement of said actuating rod thereby to engage said camming portions with said grippers and close said grippers, a lost motion connection between said actuating rod and said knives thereby to move said knives relatively away from said grippers after closure of said grippers, and means for disengaging said camming rod moving means from said camming rod after movement of said knives thereby to release a stripped wire concomitantly with conclusion of the stripping thereof.

References Cited in the file of this patent

UNITED STATES PATENTS

| | | |
|---|---|---|
| 2,338,508 | Hackbarth | Jan. 4, 1944 |
| 2,680,394 | Andren | June 8, 1954 |
| 2,765,685 | Stratman et al. | Oct. 9, 1956 |
| 2,871,740 | Andren | Feb. 3, 1959 |
| 2,886,995 | Bach et al. | May 19, 1959 |

FOREIGN PATENTS

| | | |
|---|---|---|
| 609,834 | Great Britain | Oct. 7, 1948 |